United States Patent [19]
Meighan et al.

[11] 4,359,508
[45] Nov. 16, 1982

[54] LEAD-ACID STORAGE BATTERY

[75] Inventors: Richard M. Meighan, Lansdale; Harry R. Cash, Jr., Jeffersonville, both of Pa.

[73] Assignee: Eltra Corporation, Toledo, Ohio

[21] Appl. No.: 214,735

[22] Filed: Dec. 9, 1980

[51] Int. Cl.$^3$ .............................................. H01M 10/12
[52] U.S. Cl. ..................................... 429/52; 429/228; 204/2.1; 29/623.5
[58] Field of Search ................... 429/48, 118, 52, 119, 429/225, 228; 204/2.1, 130; 29/623.5

[56] References Cited

U.S. PATENT DOCUMENTS 3,733,220  5/1973  Cortese et al. ...................... 429/118
3,834,946  9/1974  Amlie et al. ...................... 429/118 X

*Primary Examiner*—Anthony Skapars
*Attorney, Agent, or Firm*—John C. Purdue

[57] ABSTRACT

Improvements in a dry charged lead-acid storage battery and in a method for producing such a battery are disclosed. The improvements in the battery involve negative plates having an initial polarization, when on charge, not greater than zero; preferably, the positive plates have an initial polarization, when on charge, of at least 100 millivolts, and most desirably, from 150 to 180 millivolts. The improvements in the method involve, for example, reducing the initial polarization of the negative plates by partial discharge thereof after formation or by air or chemical oxidation. The battery of the invention is protected from catastrophic positive grid corrosion upon activation and consequent premature failure in service without the necessity for conventional (high voltage) boost-charging at the time of installation into a conventional float charging system.

5 Claims, No Drawings

LEAD-ACID STORAGE BATTERY

BACKGROUND OF THE INVENTION

This invention relates to storage batteries of the lead-acid type. These batteries, commonly used as standby power sources, industrial traction and stationary batteries, and in automotive and other ignition systems, contain at least one cell consisting of positive electrodes of lead peroxide and negative electrodes of spongy lead, which are immersed in a sulfuric acid electrolyte.

Because lead-acid storage battery cells are of the secondary type, the battery can be recharged at any point during the discharge portion of its charge/discharge cycle by proper application of an external current source, such as a voltage-regulated rectifier charger, alternator or generator which passes current through the battery cells in a direction opposite to that in which the cells supply current to a load. The float voltage of the battery thus can be continuously maintained during operation of an associated system so that ideally it will deliver approximately its full current capacity when it is employed to supply power to that system.

Lead-acid storage batteries are customarily stored, before installation by the ultimate user, in either a "wet charged" or "dry charged" condition. Wet charged batteries are initially charged during manufacture and are shipped to the user with the electrolyte in contact with the electrode plates in the cell compartments. Dry charged batteries are supplied with dry but active plates and are also charged at the source of manufacture, but are stored and shipped to the user in a dry condition to be activated at the time of installation by filling the cells with an acid electrolyte.

Particularly in recent years, dry charged batteries have become an important segment of the lead-acid storage battery market. This may be largely because dry charged batteries have at least partially overcome some of the problems associated with the storage of fully-charged wet batteries including, for example, handling a battery filled with acid electrolyte, gradual loss of capacity during storage necessitating periodic recharging, and severe element corrosion and sulfation within battery cells which may limit the service life of the battery. However, problems have been encountered with dry charged batteries in general, for example, loss of capacity between manufacture and first discharge due to element corrosion.

In 1906, a process of treating the iron-nickel alkaline storage batteries common at that time was disclosed by Thomas A. Edison in U.S. Pat. No. 817,162. Such batteries are described in this patent as having lost capacity during shipment, following removal of the electrolyte. Edison reported that the loss of capacity was caused by exothermic oxidation from air of iron of the negative electrode, which could be prevented by sending a reversing current through the battery to discharge the negative electrode completely.

Many modern lead-acid batteries that have been dry charged have been found to be susceptible to failure in service due to premature corrosion of the positive elements. Conventional manufacturing practices usually produce charged and dried batteries having positive plates comprising a significant amount of bare metal, produced during the operations of brushing, cutting and burning necessary to assemble the cell. It is well known that corrosion of the positive elements can be controlled by mild and continuous anodization of this bare metal when the battery is in service. However, a process is needed which, after the addition of acid electrolyte to the battery, will provide initial anodization of the bare metal of the positive elements and thus prevent catastrophic corrosion and consequent loss of electrical capacity.

It is now believed that a reason for premature positive grid corrosion and subsequent failure of dry charged storage batteries made pursuant to conventional methods is a local cell on individual plates of the positive grid of the battery, consisting essentially of a positive of the active electrode material and a negative of the bare metal of the grid. Unless the electrical potential of the positive plate is maintained at a significantly higher level than its normal rest potential, a spontaneous local discharge reaction occurs, and may continue until failure of the plate and ultimately of the battery.

In order to circumvent the problem of positive grid corrosion in activated dry charged storage batteries, the conventional recommended practice is to boost-charge the batteries after addition of the electrolyte. However, the recommended procedure, to boost-charge all cells at a voltage of 2.6 to 2.7 volts per cell, sometimes is not followed. This may be because the voltage necessary to accomplish such boost-charging is not provided by a charger available where the battery is activated, or because the directions supplied with the battery are in a language which is foreign to the user and not easily understood. In fact, even the necessity for the initial boost-charge may not be grasped by the user.

It has also been conventional practice in the art of manufacturing dry charged batteries to control the parameters of the process used to charge and dry the negative plates to provide a maximum charge thereon. Metallic lead—the principal constituent of a negative electrode—has a nautral tendency to oxidize in moist air, forming lead oxide; consequently, great care has always been taken to prevent this natural process from occurring in order to maintain the negative plate in a condition of maximum charge.

DEFINITIONS

As used herein:

"Positive Polarization" is the potential difference between a positive working electrode and a positive electrode of a non-working, stable, reference cell with a common electrolyte path.

"Negative Polarization" is the potential difference between a negative working electrode and a negative electrode of an non-working, stable, reference cell with a common electrolyte path.

Positive and negative polarizations are both positive in sign when the working cell is charging.

"Float service" is the use in which at least one properly activated battery is continuously placed in electrical connection with conventional equipment which either discharges the battery, recharges it, or overcharges it, as required by an associated, functioning electrical system. Overcharging is the predominate mode of operation and is carefully controlled to replace merely the normal losses of the battery and maintain it in a state of full charge.

"Percent" refers to percent by weight, unless otherwise indicated.

All temperatures are expressed in degrees celsius, unless otherwise indicated.

BRIEF DESCRIPTION OF THE INVENTION

The instant invention is based upon the discovery that it is advantageous to reduce the initial polarization of the negative plates of a dry charged battery, when the battery is initially charged, to nearly zero, for example by sufficient prior air or chemical oxidation. As a consequence, the intial polarization of the postive battery plates is automatically shifted to a higher value and remains high for a time sufficient to allow full and complete anodization of the bare metal thereof. The anodic coating thus formed protects the positive grid from the spontaneous corrosion processes which commonly occur in batteries produced according to methods of the prior art. Reducing the initial polarization not only enables the protection of all dry charged batteries against premature and catastrophic battery failure due to positive grid corrosion, but also eliminates the need for a conventional (high voltage) boost-charge at the time of installation, and enables the use of a standard float charge provided by conventional available equipment for the desired initial protection.

The instant invention specifically provides an improvement in a lead-acid storage battery comprising a container with an electrolyte and electrically-connected battery elements including freshly-formed positive and negative plates disposed therein. The improvement involves negative plates which have an initial polarization, on charge, of not greater than zero. Preferably, the positive plates of the battery have an initial polarization, on charge, of at least 100 millivolts.

Improvements in the conventional method for producing dry charged lead-acid batteries are also provided by the instant invention. The improvements involve reducing the initial polarization of the negative plates of the battery, when on charge, to not greater than zero. This reduction of negative plate polarization enables the initial polarization of the associated positive plates to be at least 100 millivolts. The reduction of the initial polariazation of the negative plates can be accomplished by either air or chemical oxidation; preferably, partial discharge of the negative plates occurs prior to or during drying of the plates in the manufacturing process.

Accordingly, it is an object of this invention to provide an improved charged storage battery.

It is a further object to provide improvements in a method for producing a charged storage battery.

Other objects and advantages will be apparent from the detailed description which follows, which is intended only to illustrate and disclose, but in no way to limit the invention as defined in the appended claims.

DETAILED DESCRIPTION OF THE INVENTION

This invention relates to improvements in dry charged lead-acid storage batteries and methods for producing such batteries, whereby protection from premature positive grid corrosion and resultant battery failure is achieved. The invention eliminates the necessity for conventional (high voltage) boost-charging of the batteries upon activation and installation, as heretofore has been required to afford protection to this type of battery. Instead, an initial standard float charge is sufficient to protect the battery.

A dry charged storage battery according to the invention can be manufactured by known, conventional techniques modified as disclosed herein. Specifically, a battery according to the invention can be made by modifying a conventional battery having lead peroxide positive electrodes, spongy lead negative electrodes, an acid electrolyte, a battery container, and other conventional battery components. The production of such storage batteries is described in detail in Kirk-Othmer, "Encyclopedia of Chemical Technology," 3rd ed., vol. 3, pp. 649-663, and references cited in the bibliography, and in U.S. Pat. Nos. 3,530,002 and 3,652,341.

According to the instant invention the initial polarization of the negative plates of a conventionally-produced battery is reduced, for example by oxidation, to not greater than zero when on charge. As a consequence, there is an automatic distribution* of charge voltage between the positive and negative electrodes of the battery so that the positive polarization is at least 100 millivolts. Furthermore, the positive polarization remains sufficiently high long enough to enable full and complete anodization of the bare metal on the positive electrode. This anodization results in a protective layer on the positive electrode generally believed to consist primarily of lead dioxide. Whether the surface of the positive grid of the battery is exposed or beneath a paste, a firm coating of $PbO_2$, when it covers the entire surface thereof, protects the grid from spontaneous corrosion processes so long as the positive polarization is thereafter maintained between 30 millivolts and 100 millivolts.

*This distribution is usually measured in terms of the rest potential of the cell, the positive polarization, and negative polarization. A stable rest potential of 2.058 volts is assumed herein for a typical lead-acid cell having sulfuric acid electrolyte, specific gravity 1.210, at 77 degrees fahrenheit.

A battery according to the invention also exhibits internal regulation of the applied or external cell voltage to cause an advantageous distribution of the voltage polarization between the positive and negative electrodes. Polarization of the negative electrodes is automatically suppressed upon connection of the battery to conventional float voltage equipment, as when the battery is put into service.

The following examples of methods which can be used to produce a battery according to the invention are intended only to illustrate and disclose and in no way to limit the invention.

EXAMPLE I

Dry charged lead-acid batteries were assembled from conventional components comprising a container (case, cover, and vent plugs), a plurality of electrically-connected elements ($PbO_2$ positive plates and Pb negative plates on lead grids, connected to positive and negative terminals), microporous rubber separators, and an electrolyte (a sulfuric acid solution having a specific gravity of 1.210) in which the elements were immersed. A conventional method battery assembly was used, with the exception of the modifications indicated in the following discussion, which were performed according to the improvements of the instant invention.

Battery plates were fabricated conventionally by pasting a lead grid with a lead oxide/lead sulfate paste, curing*, and forming by electrical oxidation at 2 amperes per pound of dry paste for 96 hours in sulfuric acid having an initial specific gravity of 1.100. After forming, the positive plates (the anodes in the forming bath) had an electrically-active composition of about 95% lead dioxide, and the negative plates (the cathods in the forming bath) were about 99% lead.

*The negative battery grid and plates were air-cured in an atmosphere of about 80-100% humidity at 41-52 degrees for three days. This procedure converted free lead particles in the plates to lead oxide; the free lead content of the plates was also thereby reduced to a desired level of less than 5%.

the positive battery grid and plates were air-cured in an atmosphere of substantilly 100% humidity at 80-82 degrees for 2 hours. This procedure converted the lead oxide/lead sulfate paste to a crystalline form; the free lead content was essentially zero.

After formation, the positive plates were removed from the forming tank, washed with a small amount of water to remove excess sulfuric acid, and air-dried at a temperature of about 71 degrees for approximately 16 hours. The fully-formed negative plates were removed from the forming tank, washed with water, and oxidized while still moist by exposure to air, in an atmosphere of substantially 100% humidity for a period of 15 minutes, and at a temperature in the range of 40-45 degrees. The negative plates were then dried with super-heated steam at a temperature of about 135 degrees for approximately 60 minutes.

The level of oxidation on a negative plate as a result of the procedure described above corresponded to that caused by a discharge of substantially 75% from its original fully-charged condition. This decrease was a consequence of a change (caused by the oxidation) of the valence state of lead of the plate from zero to a positive value.

Positive plates and partially-discharged negative plates produced as described above were assembled in a conventional manner into eight cells. Each individual cell consisted of 2 positive plates and 3 negative plates with conventional microporous rubber separators sandwiched between the plates. The plates were then electrically connected in parallel; the positive and negative groups were assembled by burning the individual grid lugs to lead alloy straps and terminal posts. The assembled cells were arranged so that each positive plate was located between two negative plates. After assembly, the cell elements were installed in two-cell battery containers with the cells electrically connected in series. The containers were then sealed.

The lead terminal posts of the assembled batteies were burned to the usual design for stationary industrial batteries and the positive terminal was stamped with the positive polarity symbol. A resistance check was made between the terminals to ascertain that there was no short in the connections. The cells in the battery containers were then filled with sulfuric acid electrolyte of 1.210 specific gravity (29 percent sulfuric acid). The rest potential of each cell was found to be 2.058 volts at 25 degrees: total potential between the lead terminal posts was approximately 4 volts per battery.

In order to illustrate the improvements in a dry charged storage battery of the instant invention, the performances of several types of lead-acid batteries were compared using a typical floating voltage of 2.20 volts per battery cell. All tests were conducted under conventional and identical normal conditions of battery service, such as would be encountered in typical stationary float service applications.

TYPE 1: A conventional jar-formed wet battery (i.e., a battery wherein the electrolyte had been added to the assembled cell prior to formation of the plates); when this battery was placed on the typical float voltage, the positive electrodes floated (i.e., polarized) at 30 mV to 100 mV, while the negative electrodes floated in the range of 60 mV to 150 mV.

TYPE 2: A conventional dry charged battery, activated and boost-charged at 2.65 volts per cell; initially, the positive electrodes polarized in the range of 200 mV to 300 mV while the negative electrodes polarized in the range of 300 mV to 450 mV. When this battery was placed on the typical float voltage the polarizations were substantially identical to those of the TYPE 1 battery.

TYPE 3: A conventional dry charged battery, not boost-charged; when this battery was placed on the typical float voltage, the positive electrodes floated at 5 mV to 30 mV, while the negative electrodes floated at approximately 160 mV. However, after a few weeks of conventional float service, the positive potential had decreased to a value less than zero (i.e. a value negative relative to rest potential), because of positive grid corrosion. The positive grid of the battery was found to be experiencing continuous and abnormal corrosion, a condition which would cause further self-discharge and a greater decrease in the positive potential, and early failure of the battery.

TYPE 4: A dry charged battery, conventional except that the negative electrode plates had been subjected to air oxidation ad described in the foregoing example prior to cell assembly: when this battery was placed in conventional float service with no high-voltage boost charge, the negative plates floated at zero or less, while the positive plates floated between 150 mV and 180 mV. After one week in such service, the polarizations had fallen into the ranges generally found for a conventional jar-formed cell, that is, 30 mV to 100 mV for the positive plates, and 60 mV to 150 mV for the negative plates. The battery was then tested under these same float service conditions over a period of 8 weeks; the conventional polarizations were observed over this entire period.

Air oxidation of the negative electrode, carried out as described in the foregoing example, constitutes the best presently known mode of practicing the invention. In addition, however, appropriate levels of oxidation can be achieved by exposing the plate to a humid atmosphere after drying but prior to cell assembly, by similar processing of the negative electrode after the cell has been fully assembled, or by air oxidation as illustrated in the following example.

EXAMPLE II

Fully-formed lead-acid batteries were produced by the method described in Example I, with the exception that the fully-formed negative plates were dried, without first washing with water, in super-heated steam at a temperature of about 135 degrees for approximately 60 minutes. Some forming acid therefore remained in the plates; after drying, this residual acid, together with oxygen from the air, reacted with the active negative material in the plates to effect a partial discharge thereof. This reaction was believed to be two-step; i.e. air oxidation followed by sulfation, and resulted in a level of oxidation on a negative plate corresponding to that caused by a discharge of substantially 26% from its original fully-charged condition.

A dry charged battery, convention except that the negative electrode plates had been subjected to oxidation as described in Example II, above, prior to cell assembly: when this battery was placed in conventional float service wih no high-voltage boost charge, the negative plates floated at zero or less, while the positive plates floated between 100 mV and 150 mV. After one week in such service, the polarization had fallen into the ranges generally found for a conventional jar-formed cell, that is, 30 mV to 100 mV for the positive plates, and 60 mV to 150 mV for the negative plates. The battery was then tested under these same float service conditions over a period of 8 weeks; the conventional polarizations were observed over this entire period.

As is indicated by the procedures described above in Examples I and II, negative plates having an initial polarization not greater than zero can be produced for a lead-acid storage battery, after forming, by air oxidation. Chemical oxidation of negative plates according to the invention can also be carried out in the forming bath or in a separate bath. The use of a separate bath is preferred if it is desired to avoid contamination of the forming bath, for example, so that it will be available for re-use, while use of the forming bath for the oxidizing step is preferred if it is desired to avoid the necessity for preparing a separate bath for oxidation. While the oxidation of fully-formed (charged) negative plates has been described in Examples I and Ii, it will be appreciated that partially-formed negative plates can also be used to produce batteries according to the present invention, either after partial forming or, if necessary, after partial forming and air, chemical, or the like oxidation. Similarly, electrochemical oxidation of negative plates, either fully or partially formed, can also be used in producing batteries according to the invention.

The depression of the polarization of the negative electrode to zero or less when the cell is placed in normal float service can also be accomplished, for example, by introducing a physical or chemical agent to the fully-assembed cell. Such an agent must be one which temporarily causes the hydrogen-gassing reaction normally occurring at the negative electrode during service to occur at an electrode potential much lower than normal (i.e., a potential more positive than normal). Examples of suitable chemical agents which can be used are the peroxides of hydrogen, sodium, potassium and calcium, alkali salts of peroxymonosulfuric acid, peroxydisulfuric acid and peroxyphosphoric acid, sulfurous acid and sodium, potassium and calcium sulfites. It will be appreciated that any number of agents, other than those named above, can be used successfully to produce the foregoing result. However, metal agents such as antimony, nickel and platinum, which are known to provide a depolarizing effect on a negative electrode, do so permanently and are undesirable.

Although it is usually preferred that the positive plate of a battery according to the invention be at full charge, a battery with a slightly discharged positive plate is also contemplated. However, in this case the negative plate must be oxidized (discharged) by a somewhat greater amount, i.e. by substantially 1.0% of full charge per 1.0% of discharge of the positive plate, to provide depolarization of the negative electrode and full anodization of the positive when the battery is initially placed in service. Depolarization in this instance results from the presence of lead sulfate or an equivalent compound on the negative plate.

Operable levels of oxidation on the negative plate of a battery according to the invention can range from 1% to 100% of that of a plate in its fully-charged condition. However, preferred levels of oxidation occur between 10% and 40%, most desirable between 25% and 35%, of that of a fully-charged plate, provided that the associated positive plates have been fully formed.

A battery according to the invention is preferably made by oxidizing the negative electrodes from a fully-charged condition, after forming but prior to activation of the battery by addition of the electrolyte thereto. However, it is also possible to carry out such oxidation after charging of the electrolyte to the assembled battery cell. For example, a third electrode can be inserted into each cell and discharge against such electrode can proceed to the degree of oxidation accomplished by the preferred procedures. This would have the effect and advantage of the preferred embodiments, i.e. initial depolarization of the negative electrodes, thereby protecting the battery in a like manner during float service. However, this embodiment involves additional expense.

Any number of procedures or variations of procedures of achieving the objects and advantages of the instant invention are possible, and the preceding description of preferred embodiments and examples thereof is not intended to limit the invention except as defined in the following claims.

What we claim is:

1. In a method for producing and using a dry charged storage battery comprising a container having a cell compartment and a dry charged battery element composed of a plurality of positive and negative plates with separators therebetween, which method includes the steps of forming and drying the battery element, installing the element in the cell compartment, storing the battery, and, ultimately, activating the battery and placing it in float service, the improvement of reducing the initial on charge polarization of the negative plates to not greater than zero while maintaining the on charge polarization of the positive plates sufficiently high that complete anodization of bare metal thereof is forced to occur when the battery is first charged to the extent that the on charge polarization of the positive plates becomes greater than zero.

2. In a method for producing a dry charged storage battery, the improvement claimed in claim 1 wherein the initial polarization thereof is reduced by a partial oxidation of the negative plates.

3. In a method for producing a dry charged storage battery, the improvement claimed n claim 2 wherein the partial oxidation of the negative plates is accomplished by air oxidation.

4. In a method for producing a dry charged storage battery, the improvement claimed in claim 2 wherein partial discharge of the negative plates occurs after formation and during drying said plates.

5. In a method for producing a dry charged storage battery, the improvement claimed in claim 2 wherein the partial oxidation of the negative plates is accomplished by chemical oxidation.

* * * * *

UNITED STATES PATENT AND TRADEMARK OFFICE
CERTIFICATE OF CORRECTION

PATENT NO. : 4,359,508
DATED : November 16, 1982
INVENTOR(S) : Richard M. Meighan, Harry R. Cash, Jr.

It is certified that error appears in the above-identified patent and that said Letters Patent are hereby corrected as shown below:

```
    Column 2, line 37, change "nautral" to --natural--.
    Column 3, line 40, change "polariazation" to
--polarization--.
    Column 4, line 65, change "cathods" to --cathodes--.
    Column 5, line 4, change "the" to --The--;
             line 5, change "substantilly" to
--substantially--.
    Column 6, line 19, change "ad" to --as--;
             line 58, change "convention" to --conventional--;
             line 65, change "polarization" to
--polarizations--.
    Column 7, line 17, change "Ii" to --II--.
    Column 8, line 47, change "n" to --in--.
```

Signed and Sealed this

Thirty-first Day of May 1983

[SEAL]

Attest:

DONALD J. QUIGG

Attesting Officer

Acting Commissioner of Patents and Trademarks